(12) United States Patent
Sato et al.

(10) Patent No.: US 9,752,920 B2
(45) Date of Patent: Sep. 5, 2017

(54) LIQUID-SURFACE DETECTION DEVICE

(71) Applicant: NIPPON SEIKI CO., LTD., Niigata (JP)

(72) Inventors: Tetsuya Sato, Niigata (JP); Akira Sakamaki, Niigata (JP); Takayuki Yamaura, Niigata (JP); Shigeki Koide, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 69 days.

(21) Appl. No.: 14/762,044

(22) PCT Filed: Jan. 20, 2014

(86) PCT No.: PCT/JP2014/050930
§ 371 (c)(1),
(2) Date: Jul. 20, 2015

(87) PCT Pub. No.: WO2014/112617
PCT Pub. Date: Jul. 24, 2014

(65) Prior Publication Data
US 2015/0355013 A1    Dec. 10, 2015

(30) Foreign Application Priority Data

Jan. 21, 2013  (JP) ................................ 2013-008032

(51) Int. Cl.
*G01F 23/34* (2006.01)
*G01F 23/30* (2006.01)
*G01F 23/36* (2006.01)

(52) U.S. Cl.
CPC ............ *G01F 23/34* (2013.01); *G01F 23/303* (2013.01); *G01F 23/363* (2013.01)

(58) Field of Classification Search
CPC ....... G01F 23/34; G01F 23/303; G01F 23/363
See application file for complete search history.

(56) References Cited

U.S. PATENT DOCUMENTS

| 672,178 | A | * | 4/1901 | Penfield ................. G01F 23/34 |
| | | | | 73/317 |
| 4,870,861 | A | | 10/1989 | Ohtani et al. |
| 2005/0150294 | A1 | | 7/2005 | Bouton et al. |

FOREIGN PATENT DOCUMENTS

| JP | 2003-004507 A | 1/2003 |
| JP | 2005-241553 A | 9/2005 |

OTHER PUBLICATIONS

International Search Report PCT/JP2014/050930 dated Apr. 8, 2014 with English translation.

(Continued)

*Primary Examiner* — Ryan Walsh
(74) *Attorney, Agent, or Firm* — McDermott Will & Emery LLP

(57) ABSTRACT

Provided is a liquid-surface detection device in which a holder, which turns concurrently with movement of a float arm that moves based on a change in a liquid surface, is securely and rotatably mounted on a frame. A liquid-surface detection device includes a holder that includes an upper piece and a lower piece, and a frame that includes a bearing, a first groove, and a second groove. When mounting the holder onto the frame, the first groove guides the lower piece to the second groove, and the second groove further guides the lower piece to the bearing part so that the bearing part of the frame is disposed between the upper piece and the lower piece of the holder.

6 Claims, 7 Drawing Sheets

(56) References Cited

OTHER PUBLICATIONS

Extended European Search Report issued in corresponding EP Application No. 14740646.6, dated Sep. 23, 2016.

* cited by examiner

LIQUID-SURFACE DETECTION DEVICE

CROSS REFERENCE TO RELATED APPLICATIONS

This application is the U.S. National Phase of PCT/JP2014/050930 filed Jan. 20, 2014, which claims priority to Japanese Patent Application No. 2013-008032 filed Jan. 21, 2013. The subject matter of each is incorporated herein by reference in entirety.

TECHNICAL FIELD

The present invention relates to a liquid-surface detection device that detects a liquid surface of fuel in a fuel tank of a motor vehicle.

BACKGROUND ART

As a conventional liquid-surface detection device, for example, there is the one disclosed in Patent Literature 1. This liquid-surface detection device was a liquid-surface detection device made of: a float arm provided with a float floating on the liquid surface; an arm holder to hold the float arm and moves concurrently with turning of the float arm; and a frame to turnably support the arm holder, in which a bearing part made of a through hole is provided at the frame, a shaft part to be inserted into the bearing part is provided at the arm holder, an elastically deformable engagingly locking piece provided with an engagingly locking claw is provided at the shaft part, the shaft part is inserted into the bearing part and then is engagingly locked with an engaging part of the bearing part by the engagingly locking claw, and the arm holder is turnably supported at the frame.

CITATION LIST

Patent Litereature

Patent Literature 1: Japanese Unexamined Patent Application Publication No. 2005-241553

SUMMARY OF THE INVENTION

Problems to be Solved by the Invention

However, in the conventional liquid-surface detection device, a member to turnably support the holder at the frame merely engagingly locks the holder with the engaging part of the bearing part of the frame by the engagingly locking claw provided at the arm holder, and it has been required to rigidly turnably support the holder in the frame.

Accordingly, the present invention has been made in order to solve the problem described above, and it is an object of the present invention to provide a liquid-surface detection device that rigidly turnably supports a holder in a frame.

Problems to be Solved by the Invention

A liquid-surface detection device according to present invention comprising: a holder that turns a circuit board concurrently with movement of a float that operates faithfully following a liquid surface; a terminal having an elastic piece comprising a contact point part coming into contact with an electrode part of the circuit board; and a frame incorporating a part of the terminal, wherein the liquid-surface detection device comprising: a bearing part that turnably supports an end part of a float arm held by the holder at an outer circumferential portion of the frame, and a holding part having an upper piece and a lower piece that are disposed in the holder with the bearing part being sandwiched therebetween, wherein the frame comprises: a first guiding part in which the lower piece of the holding part of the holder is movable in a rotary shaft direction of the holder; and a second guiding part in which the lower piece of the holding part is movable in a vertical direction with respect to the rotary shaft direction of the holder.

In the bearing part provided in the frame, a protrusion part is provided at the holder side, and a third guiding part that guides the protrusion part when the bearing part is moved along the second guiding part of the frame is provided in the holder.

Through holes into which end parts of a float arm holding the float at an end part thereof is to be inserted are respectively provided in the bearing part and the upper piece and the lower piece of the holding part, a first engagingly locking part that opens in a vertical direction with respect to the rotary shaft direction of the holder and holds the float arm is provided on a surface of the holder, and a second engagingly locking part for slippage proof, that prevents the float arm from coming off from the first engagingly locking part, is provided.

A liquid-surface detection device according to present invention, wherein, on side faces of the frame, first and second stopper parts that restrain turning of the holder are respectively provided, at the holder, a hanging part extending along the side face of the frame is provided, at the hanging part, an abutment surface abutting against the first and second stopper parts is provided, and an angle formed between the first and second stopper parts and a contact surface of the hanging part is substantially perpendicular.

The first and second stopper parts of the frame are composed of a protrusion part that is lower than a thickness in the rotary shaft direction of the side face of the frame.

The first and second stopper parts comprise a slippage proof wall that prevents the abutment surface from coming off from the first and second stopper parts

Effect of the Invention

The present invention can provide a liquid-surface detection device that rigidly turnably supports a holder in a frame.

MODE FOR CARRYING OUT THE INVENTION

Figure 1:
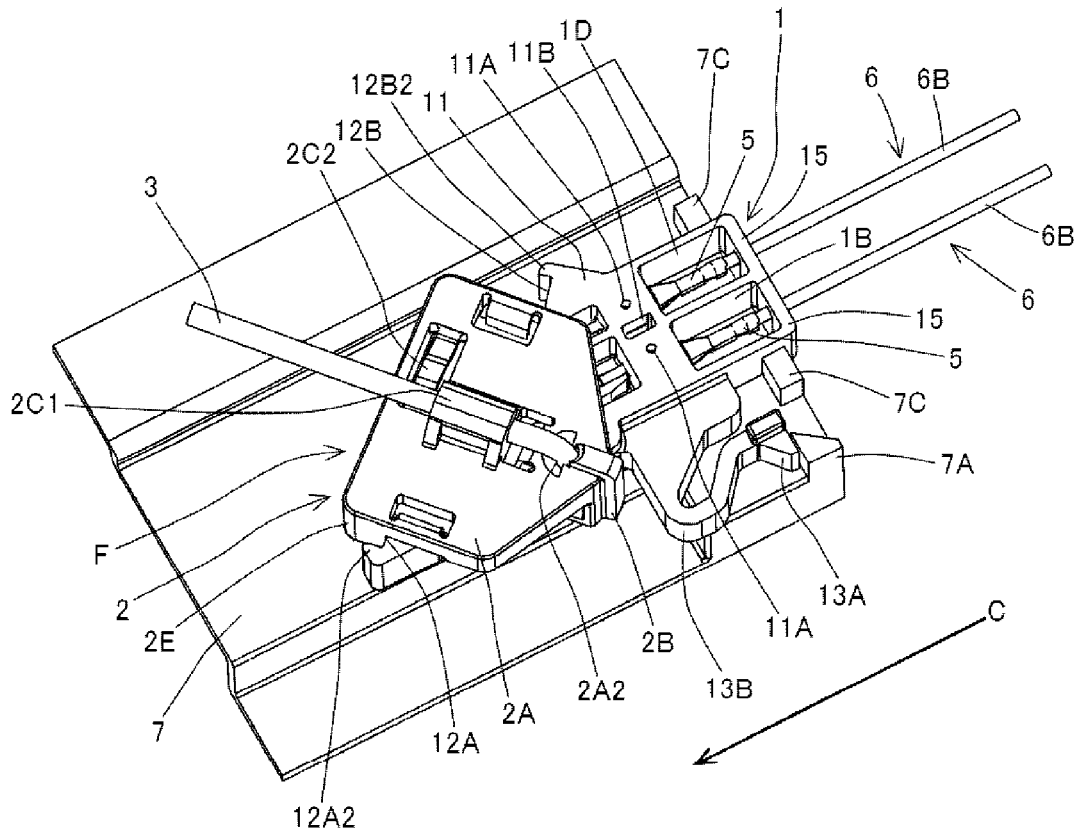
FIG. 1 is a perspective view of a liquid-surface detection device of a first embodiment of the present invention.
Figure 2:
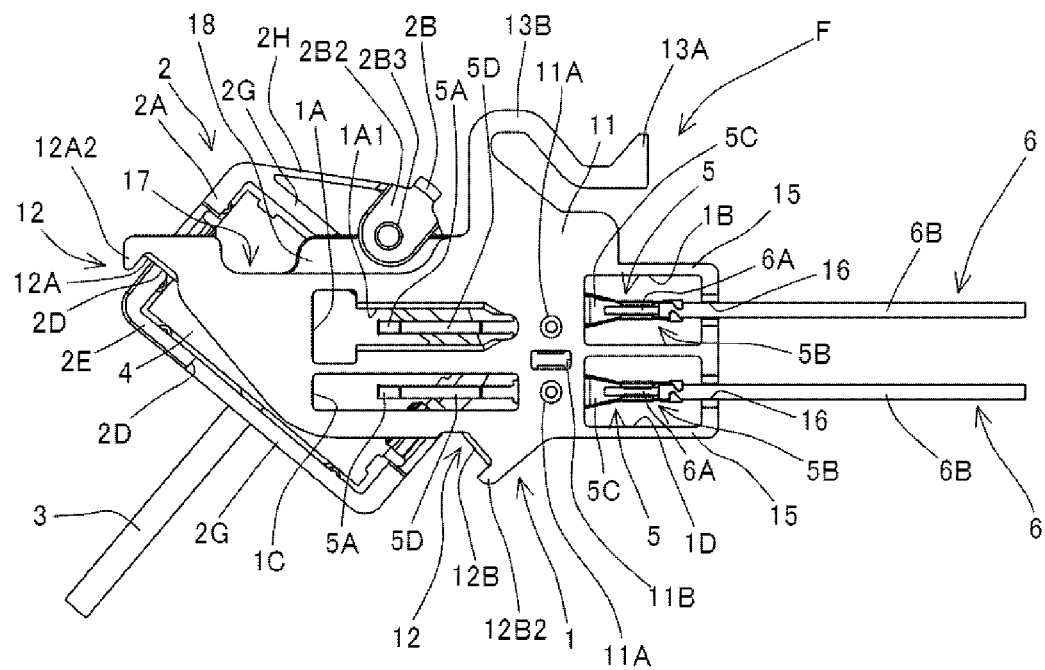
FIG. 2 is a rear view of the liquid-surface detection device of the embodiment.
Figure 3:
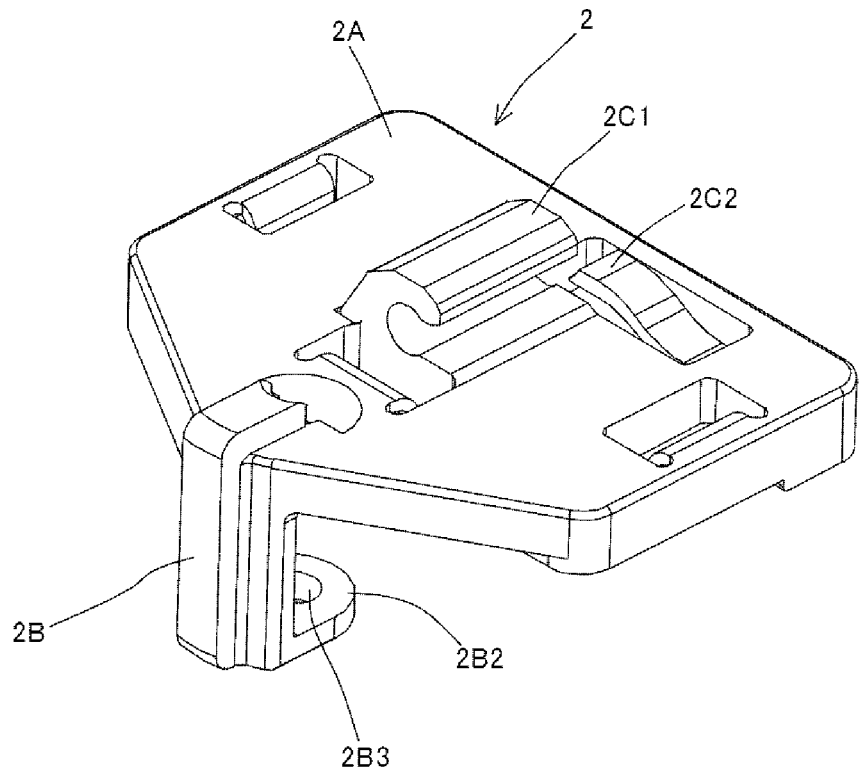
FIG. 3 is a perspective view of a holder of the embodiment.

Hereinafter, a first embodiment of the present invention will be described with reference to the accompanying drawings.

A liquid-surface detection device F of the embodiment is essentially composed of a frame 1, a holder 2, a float arm 3, a circuit board 4, and a terminal 5. It is to be noted that a wiring cable 6 is fixed to the terminal 5. Also, the liquid-surface detection device F is fixed to a mounting part 7 made of a synthetic resin or the like as is the case with a fuel pump or a mounting stay.

The frame 1 is made of a synthetic resin, for example, polyacetal, and is integrally provided with a base part 11, a stopper part 12, a hook part 13, and a bearing part 14. In addition, in the frame 1, a part of the terminal 5 is incorporated by insert molding.

Figure 13:
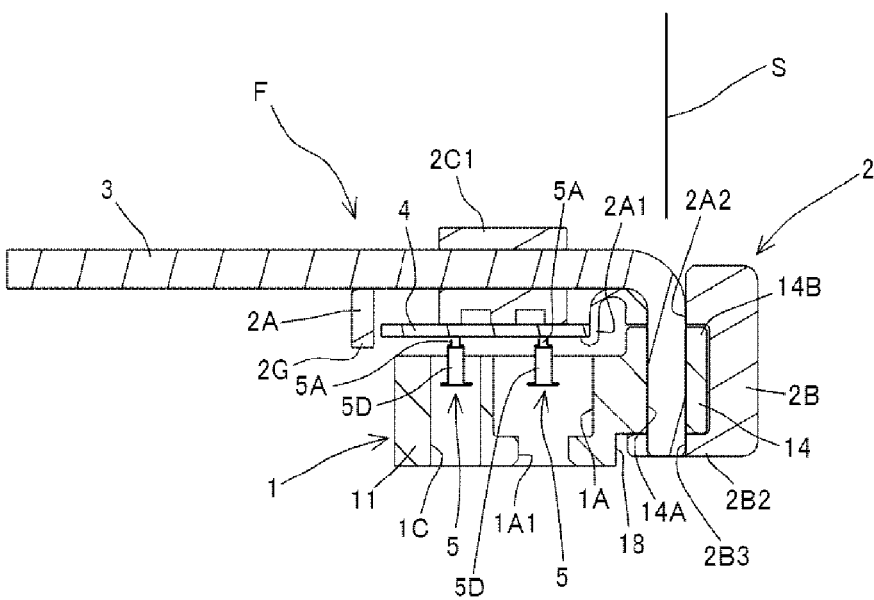
FIG. 13 is a sectional view of the liquid-surface detection device, taken along the line A-A in FIG. 12.

The base part 11 has four opening parts, first to fourth opening parts 1A to 1D formed in rectangular shapes and opening in the rotary shaft S direction of the holder 2 (the vertical direction in FIG. 13); and the first opening part 1A and the third opening part 1C and the second opening part 1B and the fourth opening part 1D are provided in two pairs, and are respectively provided along two terminals 5. To the first and third opening parts 1A, 1C, an elastic piece 5D provided with a contact point part 5A of the terminal 5 which will be described later is exposed, and is employed at the time of forming of the contact point part 5A of the terminal 5 and the elastic piece 5D. To the second and fourth opening parts 1B, 1D, a swaging part 5B of the terminal 5 which will be described later is exposed, and is employed at the time of swaging work of the swaging part 5B.

The second and fourth opening parts 1B, 1D are formed by a protection wall 15 integrally formed from the frame 1, and are intended to protect the swaging part 5B of the terminal 5. In addition, in this protection wall 15, a slit is provided as a cable drawing part 16 that draws the wiring cable 6 to the outside of the protection wall 15. It is to be noted that this cable drawing part 16 may be a through hole.

Also, at the mounting part 7 side of the first opening part 1A, there is provided a slide guide 1A1 in which a positioning part 7B of the mounting part 7 which will be described later is to be plugged. This slide guide 1A1 is formed in a T-shape as is the case with the positioning part 7B, and is formed to be slightly larger than the positioning part 7B so that the positioning part 7B can be plugged.

The stopper part 12 is intended to restrain turning of the holder 2, and is provided with a first stopper part 12A and a second stopper part 12B. The first stopper part 12A is formed to protrude from a side face of the base part 11 on the opposite side to the direction in which the wiring cable 6 is drawn, and the shape when this stopper part is seen from a top face is a substantially triangular shape. The second stopper part 12B is formed to protrude and extend from the side face of the base part 11 on the opposite side to the bearing part 14, and the shape when this stopper part is seen from a top face is a substantially triangular shape.

In addition, the first and second stopper parts 12A, 12B are protrusion parts shaped protrusively. A thickness in the rotary shaft S direction of the holder 2 of this protrusion part is smaller than a thickness in the rotary shaft S direction of the holder 2 of the side face of the frame 1. The thickness of the first and second stopper parts 12A, 12B is set to about ½ of the thickness of the side face of the frame 1. With such a structure, distortion of the first and second stopper parts 12A, 12B due to molding is restrained, and a good degree of levelness can be ensured.

In this manner, a turning angle of the holder 2, that is, an operational range of the float arm 3 is restrained by the first and second stopper parts 12A, 12B. Also, the stopper parts 12A, 12B are protrusion parts, whereby precision of the turning angle of the holder 2 can be ensured.

In addition, in the vicinity of the first and second stopper parts 12A, 12B, slippage proof walls 12A2, 12B2 to prevent the holder 2 from turning beyond the first and second stopper parts 12A, 12B are provided. The slippage proof walls 12A2, 12B2 are respectively provided at positions more outside than the holder 2 about the rotary shaft S of the holder 2.

A hook part 13 is provided with an engagingly locking part 13A and an elastic piece 13B, and the elastic piece 13B is elastically deformable, protrudes to the opposite side to the second stopper part 12B of the base part 11, is oriented to the swaging part 5B side of the terminal 5, and is formed to extend substantially in parallel to a mounting surface of the mounting part 7. An engagingly locking part 13A is provided at a tip end of this elastic piece 13B. This engagingly locking part 13A engages with an engaging part 7A provided at the mounting part 7, and the frame 1 is fixed to the mounting part 7.

In order to fix the frame 1 to the mounting part 7, the positioning part 7B of the mounting part 7 is inserted into the slide guide 1A1, the frame 1 is moved along a mounting surface of the mounting part 7 in the direction indicated by the arrow C shown in FIG. 1, and the engagingly locking part 13A is engagingly locked with the engaging part 7A, whereby the fixing completes. It is to be noted that reference numeral 7C of FIG. 1 designates a second positioning part, and is intended to restrain a position in a vertical direction along the mounting surface of the mounting part 7 with respect to a movement direction (the direction indicated by the arrow C in FIG. 1) at the time of fixing the frame 1 to the mounting part 7.

The bearing part 14 is provided at an outer circumferential portion of the frame 1, is intended to turnably support the holder 2, and is provided with a through hole 14A through which an end part of the float arm 3 is to be inserted.

In addition, the bearing part 14 is provided with a protrusion part 14B protruding to the holder 2 side in the rotary shaft S direction. This protrusion part 14B serves as a guide when the holder 2 is mounted to the frame 1.

In addition, the frame 1 is provided with a first guiding part 17 and a second guiding part 18. The first guiding part 17 is a groove in which a lower piece of a holding part, which will be described later, of the holder 2, is movable in the rotary shaft S direction of the holder 2. This first guiding part 17 is recessed more inside of the frame 1 than the through hole 14A of the bearing part 14, in other words, up to a position proximal to a vertical direction with respect to a longitudinal direction of the terminal 5 and the rotary shaft S direction. Also, the second guiding part 18 is a groove in which the lower piece of the holding part, which will be described later, of the holder 2, is movable to the longitudinal direction of the terminal 5 in the vertical direction with respect to the rotary shaft S direction of the holder 2. This second guiding part 18 is recessed more inside of the frame 1 than the through hole 14A of the bearing part 14, in other words, up to the position proximal to the vertical direction with respect to the longitudinal direction of the terminal 5 and the rotary shaft S direction, and at this second guiding part 18, the through hole 14A at the mounting part 7 side of the bearing part 14 is provided. The second guiding part 18 and the first guiding part 17 communicate with each other.

Two holes 11A provided in the base part 11 are formed by a pin positioning the terminal 5 when the terminal 5 is insert-molded in the frame 1, and a hole 11B provided at an intermediate position of the hole 11A is provided to cut a coupling part of the terminal 5 that has been integrated by the coupling part, which is not shown, at the time of molding of the frame 1. A cutting tool is inserted into this hole 11B, and divides the terminal 5 into sections.

The holder 2 is intended to turn the circuit board 4 concurrently with movement of a float that operates faithfully following a liquid surface. The holder 2 is made of a synthetic resin, for example, polyacetal, and is provided with: a circuit board housing part 2A formed in a plate shape and disposing the circuit board 4; a holding part 2B formed in a U-shape and disposing the bearing part 14 of the frame 1 therebetween; first and second engagingly locking parts 2C1, 2C2 that hold the float arm 3; and a hanging part 2E having an abutment surface 2D abutting against the stopper part 12 of the frame 1.

The circuit board housing part 2A is disposed so as to be exposed to a surface an electrode part, which is not shown, formed on the circuit board 4, and an outer circumferential part of the circuit board 4 is fixed by a plurality of hook parts 2A1 in the housing part 2A.

The holding part 2B is provided with: a circuit board housing part 2A compatible with an upper piece; and a lower piece 2B2, and between this circuit board housing part 2A and the lower piece 2B2, the bearing part 14 is disposed. In the circuit board housing part 2A and the lower piece 2B2, through holes 2A2, 2B3 are respectively provided. Into these through holes 2A2, 2B3, an end part of the float arm 3 is inserted. The float arm 3 is inserted into the through holes 14A, 2A2, 2B3 of the frame 1 and the holder 2, whereby the float arm 3 passes through the through hole 14A and the through holes 2A2, 2B3, the holder 2 is combined with the bearing part 14 of the frame 1, and with the end part of the float arm 3 being a turning center, the holder 2 is disposed to be turnable with respect to the frame 1.

The first engagingly locking part 2C1 and the second engagingly locking part 2C2 are provided on a surface of the circuit board housing part 2A of the holder 2.

The first engagingly locking part 2C1 is provided at a surface center portion of the holder 2, and forms a C-shape provided with an opening 2C3 that is open in a vertical direction with respect to the rotary shaft S direction of the holder 2. The float arm 3 can be engaged in a horizontal direction along the surface of the holder 2.

The second engagingly locking part 2C2 is a slippage proof that prevents the float arm 3 from coming off from the first engagingly locking part 2C1 after the float arm 3 has been attached to the first engagingly locking part 2C1, and is a structure that is elastically deformable in the rotary shaft S direction of the holder 2. Therefore, when the float arm 3 is engaged with the first engagingly locking part 2C1, the second engagingly locking part 2C2 is deformed to the circuit board 4 side and then enables the float arm 3 to be introduced to the first engagingly locking part 2C1, and after the float arm 3 has been fixed to the first engagingly locking part 2C1, the second engagingly locking part 2C2 is restored to its original position, whereby the float arm 3 acts so as not to slip off from the first engagingly locking part 2C1.

The hanging part 2E extends in the rotary shaft S direction of the holder 2 along the side face of the frame 1 when the holder 2 is mounted to the frame 1. This hanging part 2E is provided as an L-shaped wall part that is vertical to a corner part of the circuit board housing part 2A of the holder 2 and that is at the most distant position from the turning center of the holder 2.

The abutment surfaces 2D are end surfaces extending in the rotary shaft S of the holder 2 of this hanging part 2E, and respectively abut against the first and second stopper parts 12A, 12B of the frame 1. An angle at which these abutment surfaces 2D respectively abut against the first and second stopper parts 12A, 12B is substantially perpendicular to a surface of the protrusion parts 12A1, 12B1 of the first and second stopper parts 12A, 12B.

Figure 4:
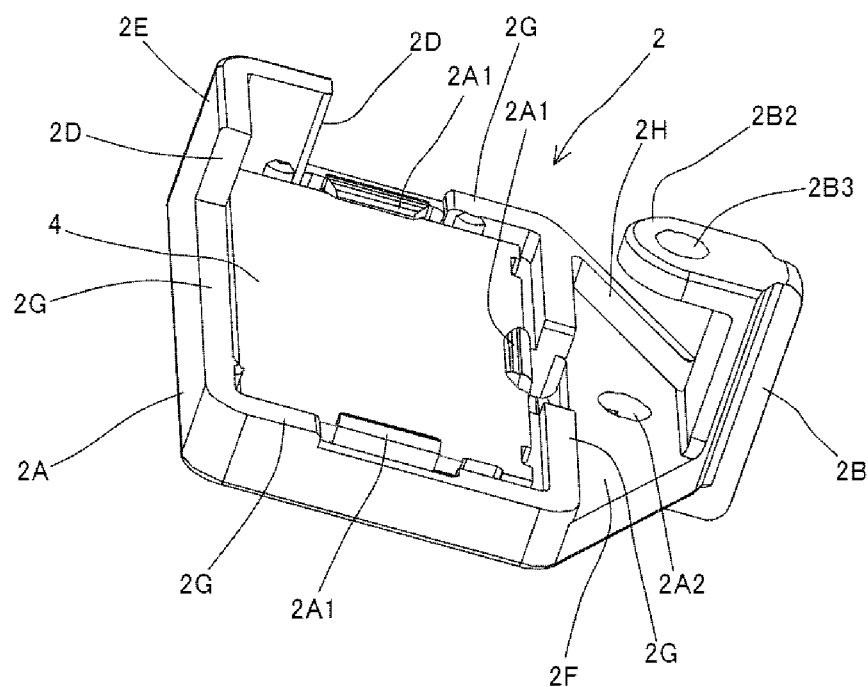
FIG. 4 is a perspective view of the holder of the embodiment.
Figure 5:
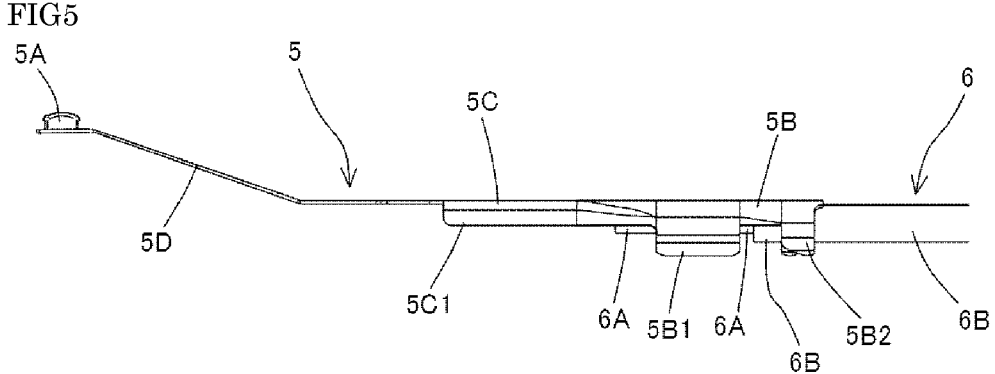
FIG. 5 is a side view of a terminal and a wiring cable of the embodiment.
Figure 6:
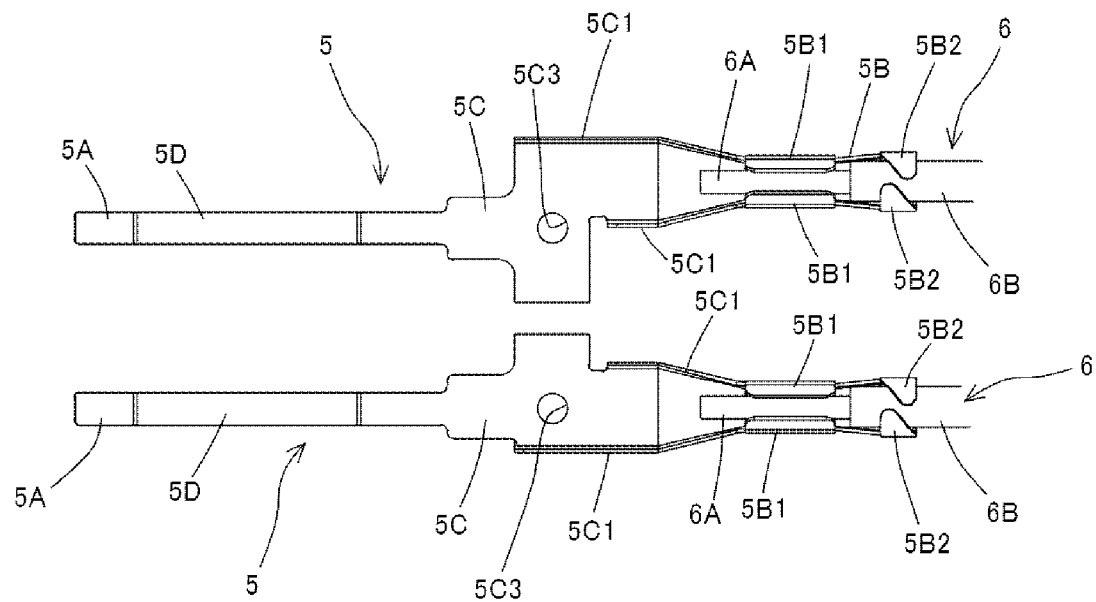
FIG. 6 is a rear view of the terminal and the wiring cable of the embodiment.
Figure 7:
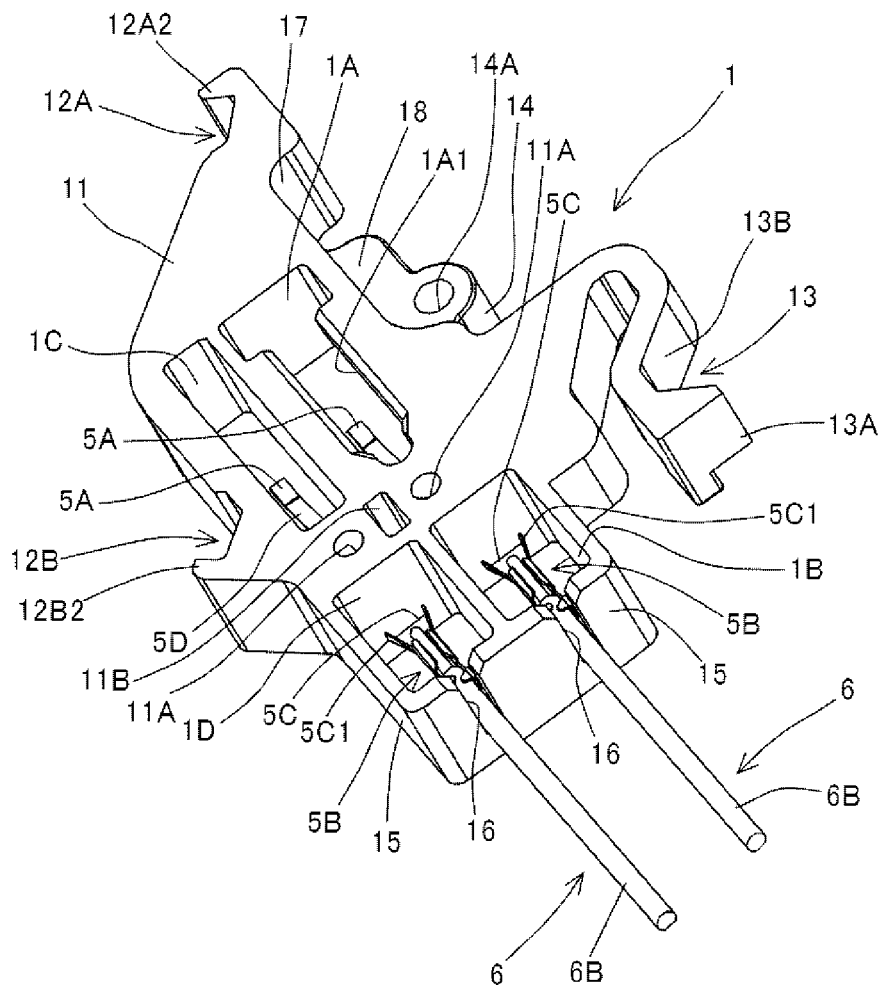
FIG. 7 is a perspective view of a frame and the wiring cable of the embodiment.
Figure 8:
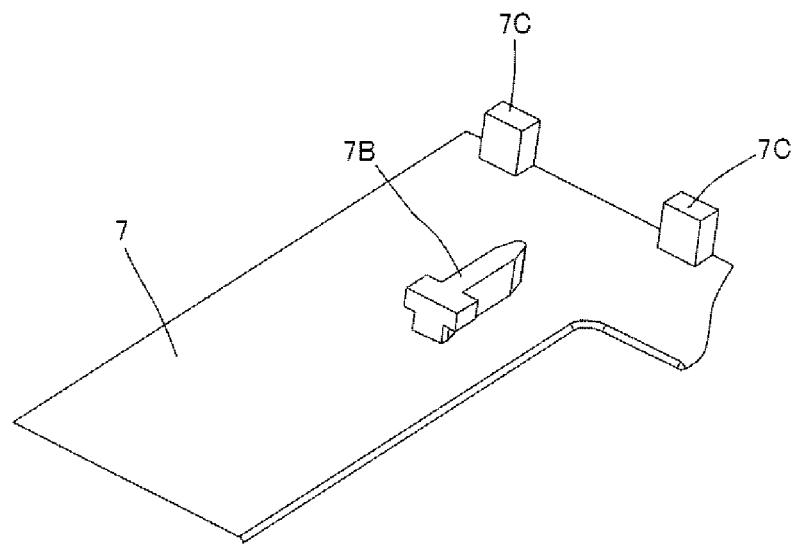
FIG. 8 is a perspective view of essential parts of a mounting part of the embodiment.

At the side at which the circuit board 4 of the circuit board housing part 2A of the holder 2 has been housed, a third guiding part 2F to guide the protrusion part 14B of the bearing part 14 of the frame 1 is provided. This third guiding part 2F is a recess formed by: a wall 2G and a wall 2H around the circuit board 4; and the holding part 2B. It is to be noted that in FIG. 4, the wall 2H provided on an outer circumference of the holder 2 restrains movement of the protrusion part 14B when the holder 2 is mounted to the frame 1, and the through hole 14A of the frame 1 and the through holes 2A2, 2B3 of the holder 2 are disposed on an approximately same straight line so that the float arm 3 can easily pass through the through holes 14A, 2A2, 2B3.

The float arm 3 is made of a hard steel wire, and is formed to be folded in a predetermined shape in order to attach to the holder 2 or to adapt to a fuel tank shape. To the float arm 3, a float which is not shown is fixed. This float is made of an NBR/phenol foaming body, floats on a liquid surface such as fuel, and operates faithfully following the liquid surface.

The circuit board 4 is provided with an electrode part which is not shown, and a conductor material or a resistor material constituting this electrode part is formed by printing or sintering on an insulation board. This circuit board 4 moves together with the float that is mounted to the holder 2 and that operates faithfully following the liquid surface.

The terminal 5 is made of nickel silver, and is provided by two. Each terminal 5 is integrally provided with: an elastic piece 5D provided with a contact point part 5A coming into contact with the electrode part of the circuit board 4; a swaging part 5B to hold the wiring cable 6; and a relay part 5C to connect the elastic piece 5D and the swaging part 5B to each other.

The elastic piece 5D is provided with a contact point part 5A made of an alloy of palladium and nickel, for example, coming into contact with the electrode part of the circuit board 4 at a tip end portion thereof and sliding on this electrode part. This elastic piece 5D is formed so that the contact point part 5A that is a tip end part thereof protrudes more significantly than a face at the holder 2 side of the frame 1, and the contact point part 5A comes into contact with the circuit board 4.

The swaging part 5B is provided with: a pair of first arm pieces 5B1 to hold a core wire 6A of the wiring cable 6; and a pair of second arm pieces 5B2 to hold a covering part 6B of the wiring cable 6, both of the arm pieces 5B1, 5B2 are rigidly swaged by a swaging jig and then the wiring cable 6 is held. In addition, these arm pieces 5B1, 5B2 are oriented in the direction of the mounting part 7. The terminal 5 is disposed at the holder 2 side of the frame 1, whereby the positioning part 7B of the mounting part 7 can be housed in the frame 1 and further the terminal 5 is disposed at the holder 2 side of the frame 1, whereby the swaging part 5B is disposed at the holder 2 side of the frame 1 as well, and in the second opening part 1B and the fourth opening part 1D, a space is formed between the swaging part 5B and the mounting part 7 side of the frame 1, the arm pieces 5B1, 5B2 that are oriented in the direction of the mounting part 7 prior to swaging in this space can be housed, and at the time of fluidization in the manufacturing process of the liquid-surface detection device F or the like, deformation of the arm pieces 5B1, 5B2 prior to swaging can be restrained.

The relay part 5C is intended to connect the elastic piece 5D and the swaging part 5B to each other, and a part of the relay part 5C is incorporated in the frame 1. The relay part 5C is provided with a reinforcement part 5C1 from the swaging part 5B to a portion communicating therewith. In this reinforcement part 5C1, a sectional shape provided with a wall formed by folding both ends of the relay part 5C forms a U-shape. This reinforcement part 5C1 is provided, whereby a retaining force in insert molding is improved, and a bending strength of the terminal 5 per se is improved.

Intervals between the elastic pieces 5D are provided to be small with respect to intervals between the swaging parts 5B of two terminals 5. This is because the intervals between the elastic pieces 5D are reduced, whereby the electrode of the circuit board 4 is downsized and consequently downsizing of the circuit board 4 is achieved. Thus, one terminal 5 is formed in a shape in which the elastic piece 5D and the swaging part 5B are offset each other without being positioned on a straight line.

The relay part 5C is provided with a hole part 5C3 with which a positioning pin, which is not shown, engages when the terminal 5 is insert-molded in the frame 1. This hole part 5C3 is provided on an extension line of the elastic piece 5D of each terminal 5. With such a structure, in comparison with a case in which a position at which the hole part 5C3 is to be provided is different depending upon terminal 5, at the time of forming of the elastic piece 5D, it is possible to restrain distortion due to bending processing of the elastic piece 5D and to make uniform a contact point load of the contact point part 5A.

The wiring cable 6 is made of two wires, a grounding wire and an output signal wire; is formed by covering a core wire 6A made of a metal such as copper with a covering part 6B made of oil-resistance cross-linking polyethylene; and is fixed to the terminal 5 by swaging.

A method of mounting the holder 2 to the frame 1 will be described with reference to FIG. 9 and FIG. 10.

Figure 9:
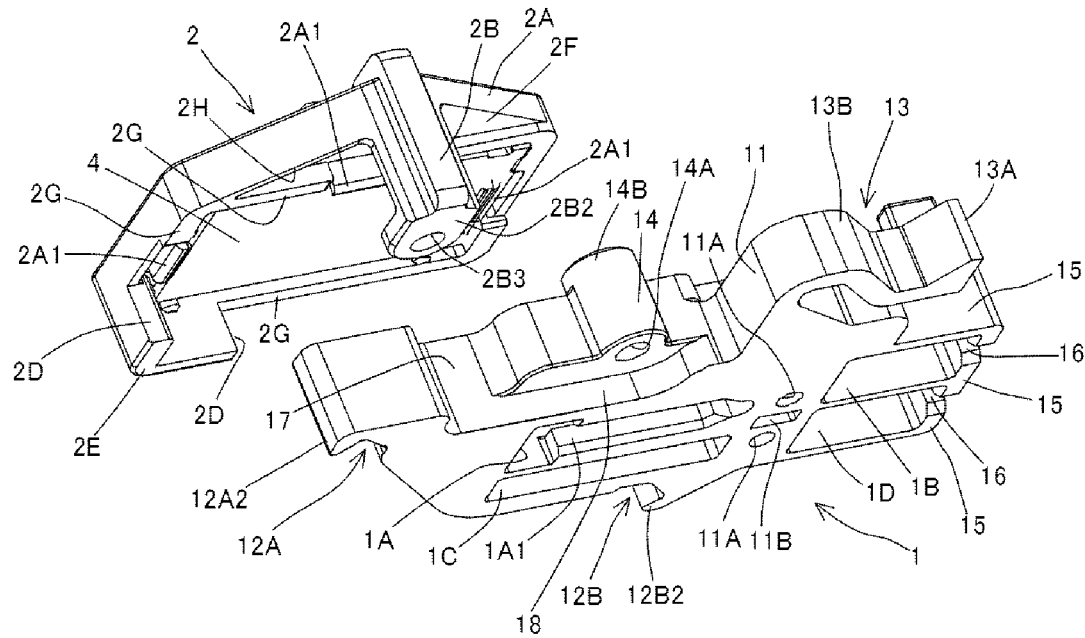
FIG. 9 is a perspective view of the frame and the holder of the embodiment.

A longitudinal direction of the circuit board 4 and a longitudinal direction of the elastic piece 5D of the terminal 5 are aligned with each other, and the holder 2 is moved to the frame 1 side so that the lower piece 2B2 of the holding part 2B of the holder 2 is from the position shown in FIG. 9 along the first guiding part 17 formed in the frame 1. At this time, the contact point part 5A of the terminal 5 comes into contact with the circuit board 4, and the protrusion part 14B of the bearing part 14 abuts against the third guiding part 2F of the holder 2.

Figure 10:
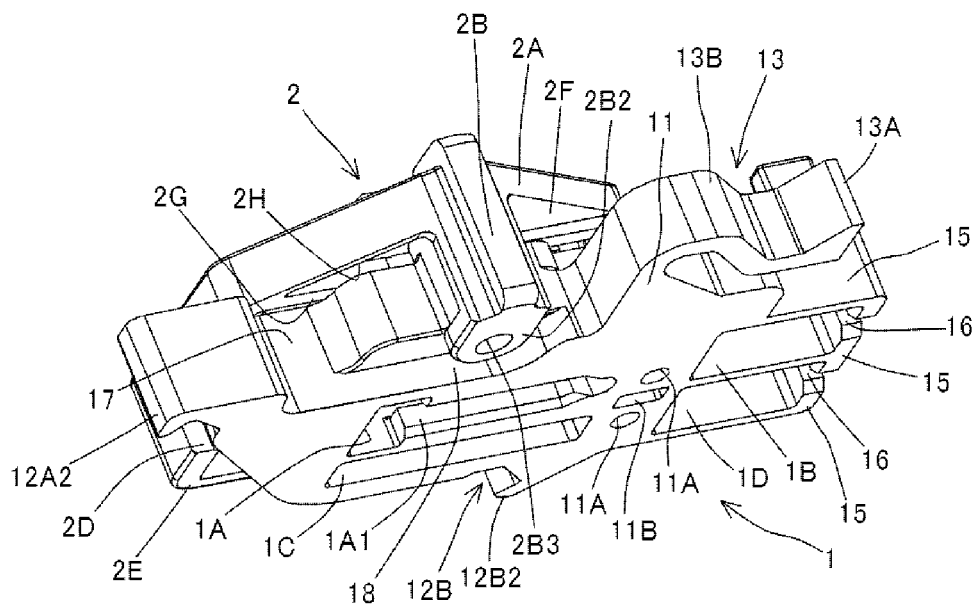
FIG. 10 is a perspective view of the frame and the holder of the embodiment.
Figure 11:
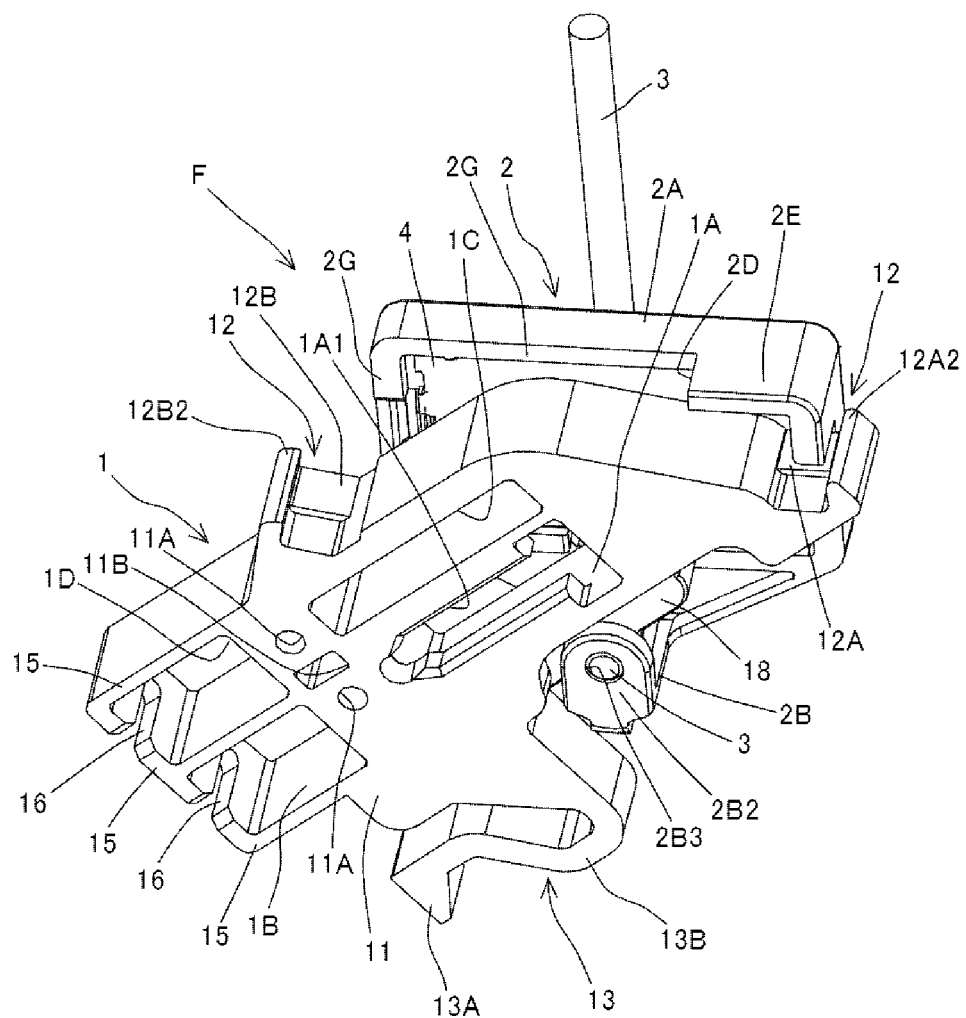
FIG. 11 is a perspective view of the liquid-surface detection device of the embodiment.
Figure 12:
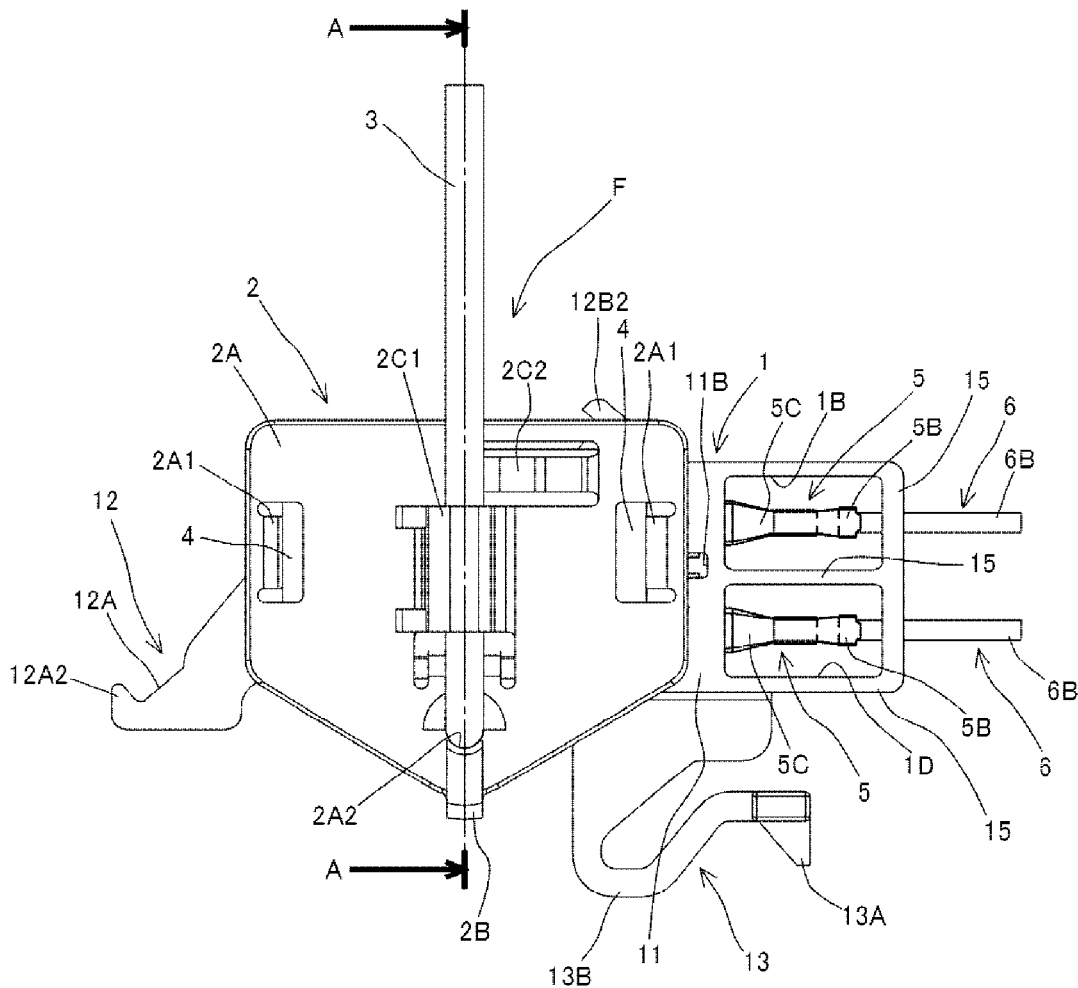
FIG. 12 is a top view of the liquid-surface detection device of the embodiment.

Next, when the holder 2 is moved up to the position shown in FIG. 10 and then the lower piece 2B2 of the holding part 2B is moved along the second guiding part 18 of the frame 1, the contact point part 5A comes into contact with the electrode part, which is not shown, of the circuit board 4.

In addition, the through holes 14A, 2A2, 2B3 of the frame 1 and the holder 2 are aligned with each other; the end part of the float arm 3 is inserted into the through hole 14A and the through holes 2A2, 2B3; the float arm 3 is turned about the end part of the float arm 3 that is inserted into the through hole 14A and the through holes 2A2, 2B3; the float arm 3 is fixed by the first engagingly locking part 2C1 and the second engagingly locking part 2C2; and mounting of the holder 2 to the frame 1 completes.

In this manner, it is possible to provide a liquid-surface detection device that rigidly turnably supports a holder in a frame.

INDUSTRIAL APPLICABILITY

The present invention is available for use in a liquid-surface detection device to detect a liquid surface of various kinds of liquids in a tank.

DESCRIPTION OF REFERENCE NUMERALS

F Liquid-surface detection device
S Rotary shaft
1 Frame
1A First opening part
1A1 Slide guide
1B Second opening part
1C Third opening part
1D Fourth opening part
2 Holder
2A Circuit board housing part (upper piece)
2A1 Hook part
2A2 Through hole
2B Holding part
2B2 Lower piece
2B3 Through hole
2C1 First engagingly locking part
2C2 Second engagingly locking part
2D Abutment surface
2E Hanging part
2F Third guiding part
2G Wall
2H Wall
3 Float arm
4 Circuit board
5 Terminal
5A Contact point part
5B Swaging part
5B1 First arm piece
5B2 Second arm piece
5C Relay part
5C1 Reinforcement part
5C3 Hole part
5D Elastic piece
6 Wiring cable
6A Core wire
6B Covering part
7 Mounting part
7A Engaging part
7B Positioning part
7C Second positioning part
11 Base part
11A Hole
11B Hole
12 Stopper part
12A First stopper part
12B Second stopper part
12A2, 12B2 Slippage proof wall
13 Hook part 13A Engagingly locking part
13B Elastic piece
14 Bearing part
14A Through hole
14B Protrusion part
15 Protection wall
16 Cable drawing part
17 First guiding part
18 Second guiding part

The invention claimed is:

1. A liquid-surface detection device comprising:
a holder configured to turn concurrently with movement of a float arm that moves based on a change in a liquid surface, wherein the holder comprises:
an upper piece that houses a circuit board and comprises a first through-hole;
a lower piece that comprises a second through-hole; and
a holding part that connects the upper piece and the lower piece;
a frame that comprises:
an upper surface;
a lower surface; and
a lateral surface extending between the upper surface and the lower surface, wherein the lateral surface comprises:
a bearing part that comprises a third through-hole;
a first groove being disposed adjacent to the bearing part, wherein the first groove extends from the upper surface to the lower surface; and
a second groove being disposed adjacent to the bearing part, wherein the second groove extends from the first groove to the bearing part,
wherein the holder is configured to be mounted on the frame so that the bearing part of the frame is disposed between the upper piece and the lower piece of the holder,
wherein when mounting the holder onto the frame, the first groove guides the lower piece of the holder from the upper surface to the second groove of the frame, and the second groove further guides the lower piece of the holder from the first groove to the bearing part to align the first through-hole of the upper piece and the second through-hole of the lower piece with the third through-hole of the bearing part,
wherein a first section of the float arm is inserted into the first through-hole, the third through-hole, and the second through-hole, and
wherein the frame houses a contact point of a terminal, the contact point is configured to be in contact with the circuit board of the upper piece when the holder is mounted on the frame.

2. The liquid-surface detection device according to claim 1, wherein the bearing part further comprises a protrusion part that protrudes from the upper surface of the frame, and the upper piece of the holder comprises a third groove that guides the protrusion part of the bearing part while the lower piece is guided along the second groove on the lateral surface of the frame.

3. The liquid-surface detection device according to claim 1, wherein
the circuit board is disposed on a first surface of the upper piece of the holder,
a first locking part and a second locking part are disposed on a second surface of the upper piece of the holder,
the first locking part is configured to hold a second section of the float arm onto the holder, and
the second locking part is configured to prevent the second section of the float arm from coming off from the first locking part.

4. A liquid-surface detection device comprising:
a holder configured to turn concurrently with movement of a float arm that moves based on a change in a liquid surface, wherein the holder comprises:
an upper piece that houses a circuit board and comprises a first through-hole;
a lower piece that comprises a second through-hole; and
a holding part that connects the upper piece and the lower piece;
a frame that comprises:
an upper surface;
a lower surface; and
a lateral surface extending between the upper surface and the lower surface, wherein the lateral surface comprises:
a bearing part that comprises a third through-hole;
a first groove being disposed adjacent to the bearing part, wherein the first groove extends from the upper surface to the lower surface; and
a second groove being disposed adjacent to the bearing part, wherein the second groove extends from the first groove to the bearing part,
wherein the holder is configured to be mounted on the frame so that the bearing part of the frame is disposed between the upper piece and the lower piece of the holder,
wherein when mounting the holder onto the frame, the first groove guides the lower piece of the holder from the upper surface to the lower surface of the frame, and the second groove further guides the lower piece of the holder from the first groove to the bearing part to align the first through-hole of the upper piece and the second through-hole of the lower piece with the third through-hole of the bearing part,
wherein the lateral surface of the frame further comprises a first stopper surface and a second stopper surface that restrain the turning of the holder,
wherein the upper piece of the holder further comprises a hanging part, the hanging part being a part of a lateral surface of the upper piece that extends towards the frame,
wherein the hanging part comprises a first abutment surface and a second abutment surface abutting against the first stopper surface and the second stopper surface, respectively, when the holder turns,
wherein when the first abutment surface is abutting the first stopper surface to restrain the turning of the holder, a first angle formed between the second abutment surface and the first stopper surface is perpendicular and a second angle formed between the second abutment surface and the second stopper surface is perpendicular, and
wherein when the second abutment surface is abutting the second stopper surface, a third angle formed between the first abutment surface and the first stopper surface is perpendicular and a fourth angle formed between the first abutment surface and the second stopper surface is perpendicular.

5. The liquid-surface detection device according to claim 4, wherein
the first stopper surface and the second stopper surface of the frame extend from the upper surface of the frame along the lateral surface.

6. The liquid-surface detection device according to claim 4, wherein
the first stopper surface and the second stopper surface comprise a slippage proof wall that prevents the first abutment surface and the second abutment surface from slipping from the first stopper surface and the second stopper surface, respectively.

* * * * *